(12) United States Patent
Kakuta

(10) Patent No.: US 7,605,955 B2
(45) Date of Patent: Oct. 20, 2009

(54) IMAGE-READING DEVICE

(75) Inventor: Masataka Kakuta, Ageo (JP)

(73) Assignee: Fujinon Corporation, Saitama (JP)

( * ) Notice: Subject to any disclaimer, the term of this patent is extended or adjusted under 35 U.S.C. 154(b) by 1144 days.

(21) Appl. No.: 10/801,814

(22) Filed: Mar. 17, 2004

(65) Prior Publication Data
US 2004/0190088 A1  Sep. 30, 2004

(30) Foreign Application Priority Data
Mar. 31, 2003  (JP)  ............................. 2003-095139

(51) Int. Cl.
H04N 1/04 (2006.01)

(52) U.S. Cl. ...................... 358/494; 358/496; 358/498; 358/474

(58) Field of Classification Search ................ 358/483, 358/497, 494, 496, 498, 474, 471, 482, 400, 358/500; 250/234, 235, 236, 208.1, 216, 250/239; 399/211
See application file for complete search history.

(56) References Cited

U.S. PATENT DOCUMENTS

| | | | | |
|---|---|---|---|---|
| 6,198,548 B1 * | 3/2001 | Yoshikawa et al. | .......... | 358/498 |
| 6,330,067 B1 * | 12/2001 | Murata | ....................... | 358/400 |
| 6,348,982 B2 * | 2/2002 | Iseki et al. | .................. | 358/474 |
| 6,750,987 B1 * | 6/2004 | Murata | ....................... | 358/474 |
| 6,903,849 B2 * | 6/2005 | Yokota | ....................... | 358/497 |
| 7,050,204 B1 * | 5/2006 | Sato et al. | .................... | 358/471 |
| 7,072,082 B2 * | 7/2006 | Yokota | ....................... | 358/497 |
| 2001/0040705 A1 * | 11/2001 | Yokota | ....................... | 358/474 |
| 2001/0043375 A1 * | 11/2001 | Yokota | ....................... | 358/497 |
| 2003/0063325 A1 * | 4/2003 | Takahashi | ................... | 358/420 |
| 2006/0050329 A1 * | 3/2006 | Yokota | ....................... | 358/474 |

FOREIGN PATENT DOCUMENTS

| | | | |
|---|---|---|---|
| JP | 10-186535 | * | 7/1998 |
| JP | 10-257251 | | 9/1998 |

* cited by examiner

Primary Examiner—Houshang Safaipour
(74) Attorney, Agent, or Firm—Arnold International; Jon W. Henry; Bruce Y. Arnold

(57) ABSTRACT

An image-reading device includes a platen glass for supporting a document, an end glass adjacent to the platen glass, a sheet member that connects bottom surfaces of the platen glass and the end glass, a feeder for feeding a document to the image-reading device, a carriage that includes a sliding member, a rod lens array mounted on the carriage, and a photo-electric transfer device for reading an image of the original document formed by the rod lens array. The carriage is biased against the platen glass and the end glass through the sliding member and moves relative to them. A controller drives the carriage at different speeds, one less than half the other, so that the carriage is moving slowly when the sliding member contacts the sheet member, thereby avoiding problems of wear of the sliding member and loss of synchronism of the motor that drives the carriage.

2 Claims, 3 Drawing Sheets

IMAGE-READING DEVICE

BACKGROUND OF THE INVENTION

An image-reading device installed in a copy machine or a similar machine generally is made so that a carriage with a mirror is moved along an original document placed on a platen glass, image light of the original document is reflected by the mirror, and the reflected image light is guided to a light receiving device such as a CCD via a rod lens array (an arrangement of multiple gradient index lenses, known as SELFOC lenses), as disclosed in Japanese Laid-Open Patent Application H10-257251.

In addition, the image-reading device may be constructed so as to enable reading an image by moving an original document. With this type of image-reading device, a feeder for feeding the original to a position at one end of the platen glass is provided, the image is read while moving the original document, and the carriage is stopped at an end position. With this type of image-reading device, it is desirable that the platen glass be separated from the feeder in order to be isolated from vibrations associated with feeding the original document. Therefore, a separate end glass, known as a CVT glass in order to distinguish it from the platen glass, is used at the bottom of the feeder.

Additionally, the applicant of the present application has developed an image-reading device that does not require a mirror by providing a rod lens array (formed of SELFOC lenses) and a CCD on the carriage as an alternative to the mirror scan method described above. With this image-reading device, the optical axis of the rod lens array faces the vertical direction toward the platen glass, and the light that passes through the rod lens array directly forms an image at the CCD light receiving device.

However, since the focal depth of the rod lens array is narrower (0.5 mm or less being common) than lenses normally used in lens barrels, the distance between the rod lens array and the platen glass must be established very strictly in an image-reading device using a rod lens array as described above. In order to maintain a fixed distance between the original document and the carriage in this type of image-reading device, sliding members that protrude in the vertical direction are installed on the carriage, and the carriage, including these sliding members, is biased elastically upward so that the sliding members make contact with the bottom surface of the platen glass.

However, with the image-reading device described above, when the carriage moves between the platen glass and the CVT glass, resistance occurs as the sliding member passes across the gap between the two glasses. Due to this, there is the risk of the sliding member wearing rapidly and vibration occurring that results in the carriage not being at its appropriate height and the movement of the carriage not being properly synchronized with a driving motor, such as a stepping motor.

BRIEF SUMMARY OF THE INVENTION

The present invention relates to an image-reading device that includes a sliding member on the carriage that passes smoothly between the platen glass and the CVT glass, preventing, for example, problems of wear of the sliding member and loss of synchronism of a stepping motor that drives the carriage. The present invention further relates to an image-reading device that acquires image data by scanning an original by moving an optical unit mounted on a carriage relative to an original and especially relates to an image-reading device that includes a feed mechanism, particularly an auto-feed mechanism, for an original document.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

A preferred embodiment of the image-reading device of the present invention will now be described with reference to FIGS. 1-3.

Figure 1:
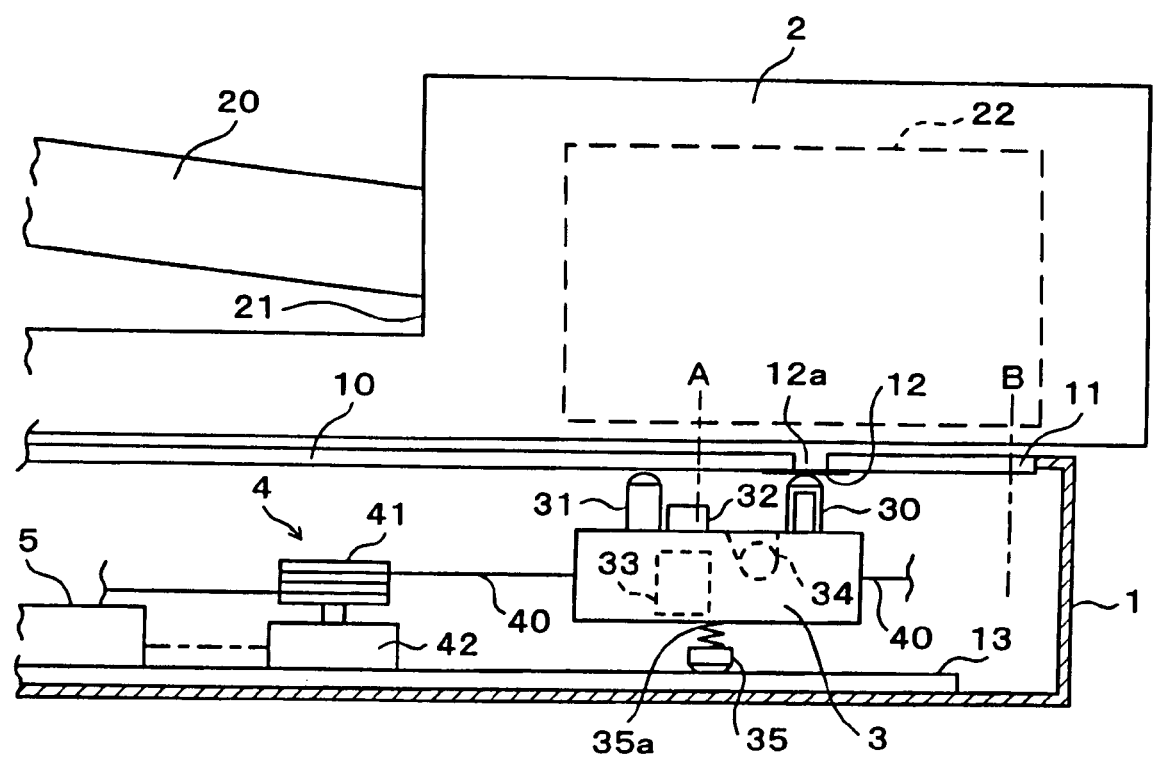
FIG. 1 shows a side cross-sectional view of a portion of an image-reading device of the present invention.
Figure 3:
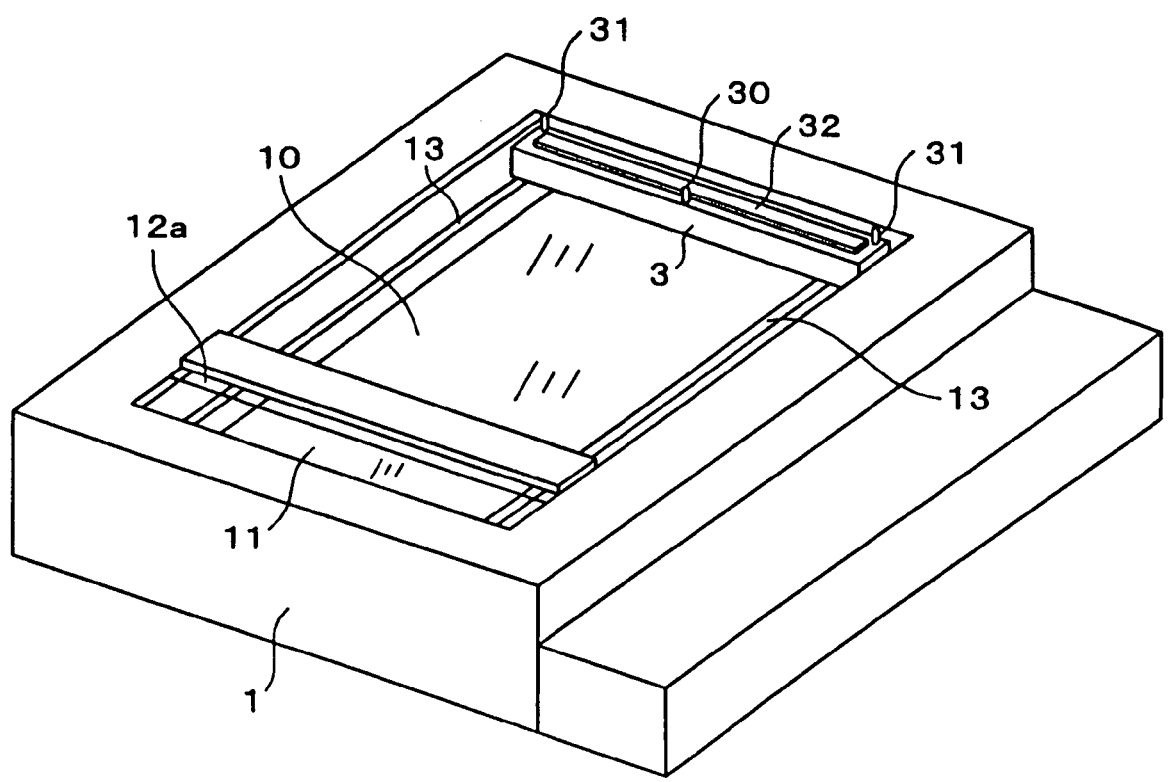
FIG. 3 shows a perspective view of the entire image-reading device of FIG. 1.

FIG. 1 shows a side cross-sectional view of an image-reading device of the present invention and FIG. 3 shows a perspective view of the entire image-reading device of FIG. 1. The image-reading device may form part of a copy machine, a facsimile machine, or a similar machine. As shown in FIGS. 1 and 3, a housing 1 forms the external frame of the image-reading device. The housing 1 has a rectangular box shape with an open top that is covered by a platen glass 10. A CVT glass, that is, an end glass 11 is installed adjacent to the platen glass 10, and a sheet member 12, which may be MYLAR tape, covers the gap 12a between the platen glass 10 and CVT glass 11, and is adhered to the lower surfaces of the CVT glass 11 and the platen glass 10. Other easily available materials, such as a stainless steel sheet material or a resin sheet material, that do not require reinforcing or strengthening may be use as the material of the sheet member.

As shown in FIG. 1, a cover 2 that may be freely opened or closed, varying its separation from the platen glass 10 and the CVT glass 11, is arranged above the platen glass 10 and the CVT glass 11. Also shown in FIG. 1 are a paper tray 20 that receives an original document and a document feeder 22 that automatically feeds the original document from the paper tray 20 one page at a time across the upper surface of the CVT glass 11 with the assistance of an ejection port 21.

As shown in FIG. 3, on the bottom surface of the housing 1, a pair of rails 13,13 that extend horizontally are installed parallel to each other. A carriage 3 is supported with the ability to slide freely in the lengthwise direction on the rails 13,13. On the carriage 3, three sliding members (i.e., projections) 30, 31, 31, are mounted to project upwardly from the carriage 3. The carriage 3 is pressed upwardly elastically by a spring or a similar biasing structure so that the sliding members 30, 31, 31, are pressed against the bottom surfaces of the platen glass 10 and the CVT glass 11. In this way, the carriage is securely supported in three locations, enabling the sliding member to securely slide against the platen glass and the end glass. The sliding members 30, 31, 31 may be made of plastic (i.e., synthetic resin) that has a small coefficient of friction. The upper ends of the sliding members are nearly spherical in order to decrease the frictional resistance with the platen glass 10 or any other surfaces they contact.

A rod lens array (SELFOC lenses) 32 with the optical axis of the lens array being vertical is mounted on the upper surface of the carriage 3. A CCD 33, which is a photoelectric transfer device and includes light detecting elements, receives light focused by the rod lens array and is arranged below the rod lens array 32. Additionally, as shown in FIG. 1, a light source 34 that irradiates light diagonally in the upward direction is mounted on the carriage 3. Furthermore, a slider 35 that slides along each rail 13 is mounted on the lower surface of the carriage 3. The slider 35 is mounted via a compression spring 35a between the frame of the carriage 3 and the rail, biasing the carriage 3 toward the platen glass 10 and other structures. The carriage 3 constructed in this manner travels on the rails 13,13 by a driving mechanism 4, described below.

Both ends of a wire 40 are connected to the carriage 3, and the wire 40 is linked to both ends of the carriage 3 by stretching the wire 40 between both ends of the carriage 3 within the housing 1 through pulleys (not shown in the drawings) arranged in the four corners of the housing 1. Additionally, as shown in FIG. 1, the wire 40 is wrapped a plurality of times around a driving pulley 41 mounted on the axis of rotation of a motor 42, such as a stepping motor.

As shown in FIG. 1, the image-reading device includes a controller 5 for driving the carriage. The controller 5 controls the rotation of the rotor of the motor 42 according to programmed control, which, in turn, controls the position and speed of the carriage 3. The controller 5 may also include electronic circuits for receiving image data from the CCD 33 and transferring the image data to an image processor.

The operation of the image-reading device is as follows, with further reference to FIGS. 1-3. The original position of the carriage 3 is at the other end of the housing from that shown in FIG. 1. At that position, when an original document is placed on the upper surface of the platen glass 10 and the start button of the operation panel is pushed, the motor 42 rotates, and the carriage 3 travels toward the other end of the housing that includes the CVT glass 11, that is, toward the right in FIG. 1, while the original document is being read. When the carriage 3 reaches a position slightly to the left of the position of the carriage 3 position shown in FIG. 1, the motor 42 rotates in the opposite direction, and the carriage 3 returns to the original position.

While the carriage 3 travels toward the right, the light source 34 illuminates the original document and an image of the original document is formed by light reflected from the original 5 document that passes through the rod lens array 32. The light that passes through the rod lens array 32 forms an image at the CCD 33. Then, the CCD 33 outputs to the controller 5 the image data that corresponds to the received light, and the controller 5 transmits the input image data to an image processor.

When the original document is set on the paper tray 20, the controller 5 moves the carriage 3 to the right from the original position and stops the carriage when the sliding member 30 is at the position indicated by reference symbol B in FIG. 1. At this position, an image of the original document is read by the CCD 33 on the carriage 3 when the original document is sent from the paper tray 20 by the feeder 22 across the upper surface of the CVT glass 11 (hereinafter this position of the carriage 3 is referred to as the "CVT position B").

Figure 2A:
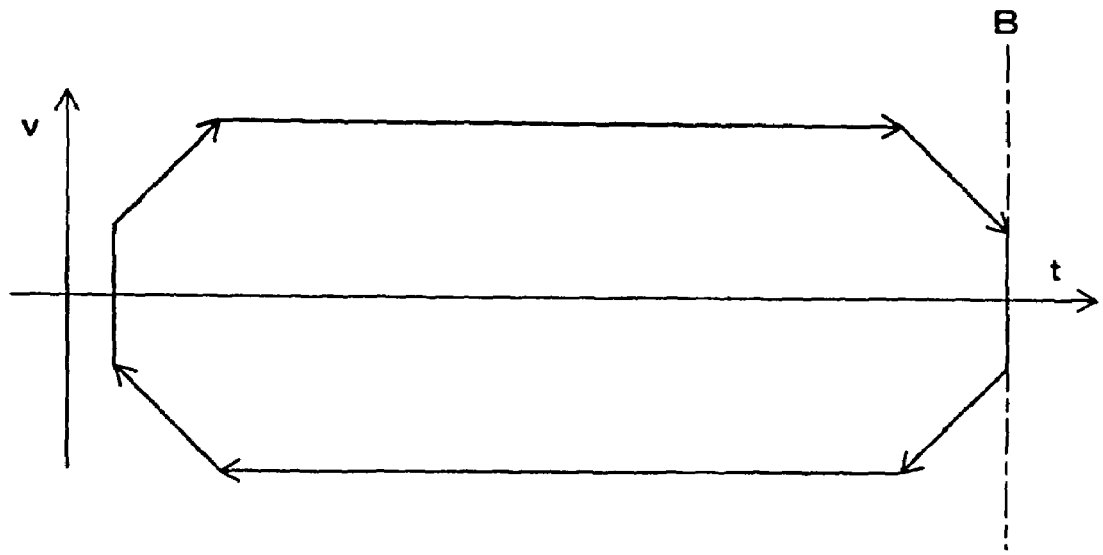
FIGS. 2A-2B show diagrams of carriage velocities versus time for a conventional image-reading device and for the image-reading device of FIG. 1, respectively.

FIG. 2A shows a diagram of the velocity v of the carriage 3 versus time t for the case of controlling the movement of the carriage 3 by technology developed prior to the present invention. As shown in FIG. 2A, the carriage 3, which is stopped at the original position, is accelerated until reaching a prescribed speed, and then moves at a constant speed. Then, when the carriage 3 approaches the CVT position B, the speed of rotation of the motor 42 continuously decreases to decelerate the carriage until the carriage 3 is stopped at the CVT position B.

Further, when positioning of the original document on the platen glass 10 has been completed, the controller 5 accelerates the carriage 3 until reaching a constant speed by rotating the motor in the opposite direction. During that time, the carriage 3 travels to the left as shown in FIG. 1 at a constant speed until it stops at the original position after decelerating just prior to reaching the original position.

In the control of the movement of the carriage 3 described above, the sliding member 30 of the carriage 3 passes across the gap 12a between the platen glass 10 and the CVT glass 11 at a constant speed, both when moving toward the CVT position B and toward the original position. At these times, because the sliding member 30 is pressed against the platen glass 10 and the CVT glass 11, the sliding member 30 and the carriage 3 may be affected by the gap 12a that exists between the platen glass 10 and the CVT glass 11. It is possible that the changes in height of the carriage 3 at the gap 12a and vibration of the carriage in that region may cause excessive wear of the sliding member 30 or loss of proper synchronization of movement of the carriage 3 with the operation of the motor 42.

Figure 2B:
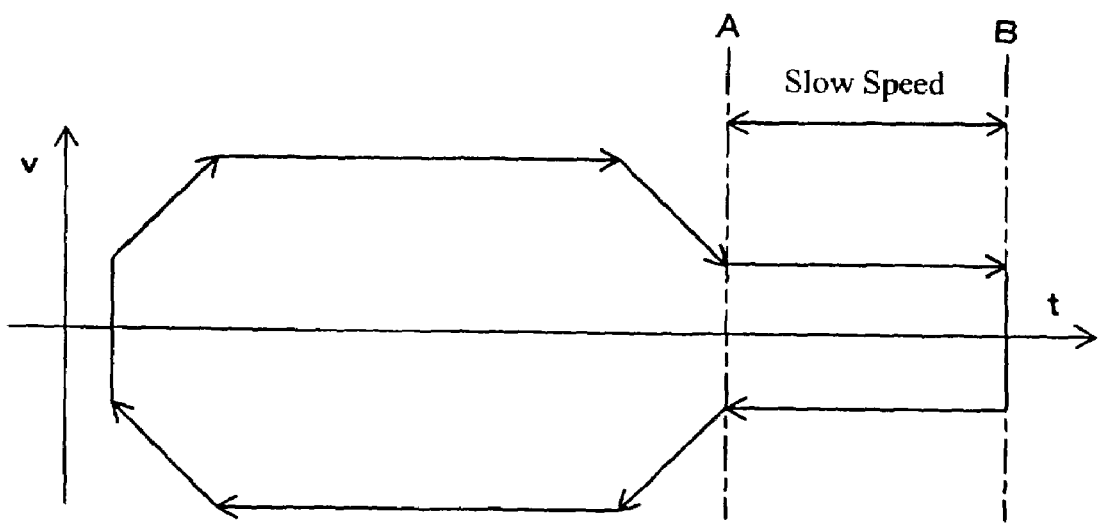

FIG. 2B shows a diagram of the velocity of the carriage 3 versus time for the case of controlling the movement of the carriage 3 of the entire image-reading device of FIG. 1, which is in accordance with the present invention. First, the carriage 3 that is stopped at the original position is accelerated to a constant speed. Then the carriage 3 continues to travel at the constant speed toward the position shown in FIG. 1. When the carriage 3 reaches a certain position in front of the CVT position B (i.e., the position where the sliding member 30 is at the point A in FIG. 1), the motor 42 operates to reduce the speed of the carriage 3 to a minimum speed that is relatively slow. The carriage 3 travels continuously at this slow speed and the sliding member 30 passes the adjacent edges of the platen glass 10 and the CVT glass 11. Then, at the time the carriage 3 reaches the CVT position B, the rotation of the motor 42 is stopped. When this occurs, the inertial force of the carriage 3 is small because the carriage 3 is traveling at a slow speed. Therefore, there is no possibility of loss of synchronization even if the motor 42 is a stepping motor. In addition, since the slow speed of the carriage 3 is a suitable speed if the carriage 3 can be stopped at the same time that the motor 42 is stopped, the suitable slow speed may be faster than the minimum speed possible for the carriage. If the slow speed is half or less than the maximum speed, it is not necessary to use a special material for the sheet member 12 that bridges the gap 12a, and any problems of vibration of the carriage 3 caused by the thickness of the sheet member at the gap 12a are suppressed.

In order to move the carriage 3 from the CVT position B to the original position, the motor 42 is rotated in the opposite direction, and the carriage 3 passes the adjacent edges of the platen glass 10 and the CVT glass 11 at a slow speed. Then, when the sliding member 30 reaches point A, the motor 42 is accelerated to a constant speed. The carriage 3 then travels to the left at the constant speed and is stopped at the original position by being decelerated due to the operation of the motor 42 just prior to the carriage 3 reaching the original position.

As shown in FIG. 2B, in the image-reading device of the present invention, the carriage travels at one of two different constant speeds, one speed being less than one-half the other speed, during a significant portion of the time the carriage travels from one end of the image-reading device to the other end.

According to the construction of the image-reading device described above, when the sliding member 30 passes the edges of the platen glass 10 and the CVT glass 11, the impact of any difference in levels of the platen glass 10 and the CVT glass 11 is small because the carriage 3 travels at a slow speed. Therefore, problems of wear of the sliding member 30 and loss of synchronization with the motor 42 can be prevented.

The use of MYLAR tape as the sheet member 12, as described above, to connect the bottom surfaces of the platen glass 10 and the CVT glass 11 is particularly effective in reducing the impact of variations in levels of the platen glass 10 and the CVT glass 11. Additionally, because the slow speed of the carriage 3 is a speed that has the ability to stop the carriage 3 at the same time the rotation of the motor 42 is stopped, the position of the carriage 3 can be precisely controlled.

The invention being thus described, it will be obvious that the same may be varied in many ways. For example, although, as described above, a rod lens array with a vertical optical axis is used, the optical axis can be directed differently. For example, the rod lens array may have its optical axis directed in the direction of movement of the carriage and receive light reflected by a mirror that receives light reflected from an original document. Additionally, although the invention as described above includes the light source to irradiate light onto the original document being mounted on the carriage, the light source may be separate from the carriage. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image-reading device having a first end and a second end and comprising:
   a platen glass for supporting an original document;
   an end glass adjacent to the platen glass;
   a sheet member that connects bottom surfaces of the platen glass and the end glass;
   a feeder for feeding a document to the platen glass;
   a carriage arranged for movement relative to the platen glass and the end glass from the first end of the image-reading device toward the second end of the image-reading device;
   a rod lens array mounted on the carriage;
   a photoelectric transfer device for reading an image of the original document formed by the rod lens array; and
   a controller for driving the carriage at a first speed as it travels from said first end to said second end and for driving the carriage at a second speed that is slower than said first speed during a time the carriage is traveling near said second end;
   wherein
   the carriage includes a sliding member that is biased against the sheet member during a time the carriage is being driven by the controller at said second speed; and
   said second speed is less than one-half the maximum speed of the carriage.

2. An image-reading device having a first end and a second end and comprising:
   a platen glass for supporting an original document;
   an end glass adjacent to the platen glass;
   a sheet member that connects bottom surfaces of the platen glass and the end glass;
   a feeder for feeding a document to the platen glass;
   a carriage arranged for movement relative to the platen glass and the end glass from the first end of the image-reading device toward the second end of the image-reading device;
   a rod lens array mounted on the carriage;
   a photoelectric transfer device for reading an image of the original document formed by the rod lens array; and
   a controller for driving the carriage at a first speed as it travels from said first end to said second end and for driving the carriage at a second speed that is slower than said first speed during a time the carriage is traveling near said second end;
   wherein
   the carriage is biased against the platen glass during a time the carriage is being driven by the controller at said first speed;
   the carriage is biased against the end glass during a time the carriage is being driven by the controller at said second speed;
   the carriage includes a sliding member that is biased against the sheet member during a time the carriage is being driven by the controller at said second speed; and
   said second speed is less than one-half the maximum speed of the carriage.

\* \* \* \* \*